US 9,875,418 B2

(12) United States Patent
Hwang et al.

(10) Patent No.: US 9,875,418 B2
(45) Date of Patent: Jan. 23, 2018

(54) METHOD AND APPARATUS FOR DETECTING BIOMETRIC REGION FOR USER AUTHENTICATION

(71) Applicant: Samsung Electronics Co., Ltd., Suwon-si, Gyeonggi-do (KR)

(72) Inventors: Wonjun Hwang, Seoul (KR); Changkyo Lee, Seoul (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/082,193

(22) Filed: Mar. 28, 2016

(65) Prior Publication Data
US 2017/0109592 A1   Apr. 20, 2017

(30) Foreign Application Priority Data

Oct. 20, 2015   (KR) .................. 10-2015-0145741

(51) Int. Cl.
  *G06K 9/00*   (2006.01)
  *G06K 9/32*   (2006.01)
(52) U.S. Cl.
  CPC ..... *G06K 9/00885* (2013.01); *G06K 9/00604* (2013.01); *G06K 9/3233* (2013.01); *G06K 9/0061* (2013.01)
(58) Field of Classification Search
  USPC ........................................ 382/118
  See application file for complete search history.

(56) References Cited

U.S. PATENT DOCUMENTS

| 2007/0030391 A1* | 2/2007 | Kim ................. G06K 9/00751 348/564 |
| 2009/0290799 A1* | 11/2009 | Matsuzaka ......... G06K 9/00248 382/195 |

(Continued)

FOREIGN PATENT DOCUMENTS

| JP | 2006268248 A | 10/2006 |
| JP | 2007206963 A | 8/2007 |

(Continued)

OTHER PUBLICATIONS

Kim et al., "A Method to Improve the Performance of Adaboost Algorithm by Using Mixed Weak Classifier," Journal of Institute of Control, Robotics, and Systems, 2009, p. 457-464, vol. 15, No. 5, Institute of Control, Robotics, and Systems, Dec. 2009.

(Continued)

*Primary Examiner* — Jerome Grant, II
(74) *Attorney, Agent, or Firm* — Harness, Dickey & Pierce, P.L.C.

(57) ABSTRACT

A method of detecting a biometric region, the method including receiving an input image; setting a plurality of regions of interest (ROI) corresponding to a plurality classifiers, respectively, the plurality of classifiers corresponding to a plurality of multi-stages, respectively, the plurality of ROIs having different sizes with respect to each other, each ROI of the plurality of ROIs including a biometric region of the input image; calculating a plurality of similarity values for the plurality of classifiers, respectively, based on the ROIs corresponding to the plurality of classifiers from among the plurality of ROIs; and detecting a first biometric region for a user authentication based on at least one of the plurality of similarity values.

17 Claims, 10 Drawing Sheets

(56) References Cited

U.S. PATENT DOCUMENTS

| | | | |
|---|---|---|---|
| 2012/0321142 | A1 | 12/2012 | Trojanova et al. |
| 2014/0250517 | A1* | 9/2014 | Kim .................. H04L 9/3228 726/7 |
| 2014/0334694 | A1* | 11/2014 | Perez Lopez ...... G06K 9/00617 382/117 |
| 2015/0139538 | A1 | 5/2015 | Lin et al. |
| 2015/0154441 | A1 | 6/2015 | Zhang et al. |
| 2016/0086304 | A1* | 3/2016 | Hsieh .................. G06T 11/00 382/201 |

FOREIGN PATENT DOCUMENTS

| | | |
|---|---|---|
| JP | 2009301367 A | 12/2009 |
| JP | 2010102504 A | 5/2010 |
| KR | 20150005094 A | 1/2015 |
| KR | 20150027393 A | 3/2015 |

OTHER PUBLICATIONS

Choi et al., "Implementation of Driver Fatigue Monitoring System," The Journal of Korean Institute of Communications and Information Sciences, 2012, p. 711-720, vol. 37C, No. 8, http://dx.doi.org/10.7840/kics.2012.37C.8.711, Dec. 2012.

Yoon et al., "Real-time pedestrian recognition technique for vehicle vision system," 2011, p. 1695-1696, The Institute of Electronics Engineers of Korea, http://www.dbpia.co.kr/Article/NODE02337065, Dec. 2011.

Kim et al., "Robust Eye Region Discrimination and Eye Tracking to the Environmental Changes," Journal of the Korea Institute of Information and Communication Engineering, 2014, p. 1171-1176, vol. 18, No. 5, The Korea Institute of Information and Communication Engineering, Dec. 2014.

Park et al., "A Study on Eye Detection by Using Adaboost for Iris Recognition in Mobile Environments," The Institute of Electronics Engineers of Korea—Computer and Information, 2008, p. 1-11, vol. 45, No. 4, The Insitute of Electronics Engineers of Korea, Dec. 2008.

* cited by examiner

METHOD AND APPARATUS FOR DETECTING BIOMETRIC REGION FOR USER AUTHENTICATION

CROSS-REFERENCE TO RELATED APPLICATION

This application claims priority under 35 U.S.C. §119 to Korean Patent Application No. 10-2015-0145741, filed on Oct. 20, 2015, in the Korean Intellectual Property Office, the entire contents of which are incorporated herein by reference.

BACKGROUND

1. Field

At least one example embodiment relates to a method and apparatus for detecting a biometric region for user authentication.

2. Description of the Related Art

Recently, with developments in various mobile devices such as a smartphone and wearable devices, an importance of a secured authentication is increasing. In Biometrics authentication technology, a user may be authenticated based on, for example, a fingerprint, an iris, voice, a face, and a blood vessel. The biometrics authentication technology may use a unique biometric property of each user because the biometric property may be robust against forgery or falsification, not cause an inconvenience for carrying, and change little over a lifetime.

For example, a fingerprint recognition technique is widely commercialized due to various advantages such as convenience, security, and economical feasibilities. In addition to a contact type authentication such as the fingerprint recognition, there is provided a contactless type authentication, for example, an iris based authentication. Since the iris based authentication is the contactless type authentication, a user may freely use a portable device with a hand, which may bring an increased convenience to the user.

SUMMARY

Some example embodiments relate to a method of detecting a biometric region.

According to at least some example embodiments, a method of detecting a biometric region includes receiving an input image; setting a plurality of regions of interest (ROI) corresponding to a plurality classifiers, respectively, the plurality of classifiers corresponding to a plurality of multi-stages, respectively, the plurality of ROIs having different sizes with respect to each other, each ROI of the plurality of ROIs including a biometric region of the input image; calculating a plurality of similarity values for the plurality of classifiers, respectively, based on the ROIs corresponding to the plurality of classifiers from among the plurality of ROIs; and detecting a first biometric region for a user authentication based on at least one of the plurality of similarity values.

The plurality of classifiers may include a first classifier, a second classifier, and a third classifier, the first, second, and third classifier each differing from one another, the setting a plurality of ROIs may include setting a first ROI to have a first size for the first classifier, setting a second ROI to have a second size for the second classifier, and setting a third ROI to have a third size for the third classifier, and the plurality of ROIs may include the first, second, and third ROIs.

The first size, the second size, and the third size may increase or decrease in sequence.

The method may further include receiving an initial size, wherein the setting a first ROI to have a first size includes setting the initial size to be the first size.

For each classifier of the plurality of classifiers, the classifier may be previously trained based on the a different corresponding size, the corresponding size being the size of the ROI to which the classifier corresponds.

The detecting may include detecting the first biometric region based on at least one of the plurality of similarity values and a threshold.

The detecting may include determining an ROI from among the plurality of ROIs to be a candidate region for the user authentication when a similarity value from among the plurality of similarity values is greater than the threshold.

The method may further include generating a leaning model prior to the detecting a first biometric region for a user authentication, and determining the threshold based on the learning model.

The learning model may be determined based on at least one of the different sizes set for the plurality of ROIs.

According to at least some example embodiments, a method of detecting a biometric region may include receiving an input image including a biometric region; scanning the input image using a first detection window of a first size; detecting a first region of interest (ROI) including the biometric region by applying information corresponding to the first detection window to a first classifier; scanning the first ROI using a second detection window of a second size that is smaller than the first size; and detecting a second ROI including the biometric region by applying information corresponding to the second detection window to a second classifier.

The first classifier may be previously trained based on an ROI set in the first size, and the second classifier is previously trained based on an ROI set in the second size.

The detecting a first ROI may include determining whether the first ROI includes the biometric region based on a similarity value output by the first classifier and a first threshold, and the similarity value may indicate a degree to which the first ROI corresponds to an eye region.

The detecting a second ROI may include determining whether the second. ROI includes the biometric region based on a similarity value output by the second classifier and a first threshold, and the similarity value may indicate a degree to which the second ROI corresponds to an iris region.

The biometric region may include an iris region.

According to at least some example embodiments, a non-transitory computer-readable medium stores a computer program including instructions that, when executed by one or more processors, cause the one or more processors to perform the method of detecting a biometric region.

According to at least some example embodiments, an apparatus for detecting a biometric region includes a memory storing computer-executable instructions; and one or more processors configured to execute the instructions such that the one or more processors are configured to, receive an input image, set a plurality of regions of interest (ROI) corresponding to a plurality classifiers, respectively, the plurality of classifiers corresponding to a plurality of multi-stages, respectively, the plurality of ROIs having different sizes with respect to each other, each ROI of the plurality of ROIs including a biometric region of the input image, calculate a plurality of similarity values for the plurality of classifiers, respectively, based on the ROIs corresponding to the plurality of classifiers from among the plurality of ROIs, and detect a first biometric region for a user authentication based on at least one of the plurality of similarity values.

The plurality of classifiers may include a first classifier, a second classifier, and a third classifier, the first, second, and third classifier each differing from one another, the one or more processors may be configured to execute the instructions such that the one or more processors are configured to set a first ROI to have a first size for the first classifier, set a second ROI to have a second size for the second classifier, and set a third ROI to have a third size for the third classifier, and the plurality of ROIs may include the first, second, and third ROIs.

The first size, the second size, and the third size may increase or decrease in sequence.

The one or more processors may be configured to execute the instructions such that the one or more processors are configured to determine an ROI from among the plurality of ROIs to be a candidate region for the user authentication when a similarity value from among the plurality of similarity values is greater than a first threshold, the first threshold being a threshold determined based on a first learning model, the first learning model being determined based on at least one of the plurality of ROIs.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms including technical and scientific terms used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following example embodiments may be applied to process an input image including a biometric region. A recognizing operation may be performed by, for example, a fingerprint recognizer, a pulse recognizer, and an iris recognizer. Hereinafter, an operation of recognizing a biometric region of a user may include an operation of identifying or authenticating the user by recognizing the biometric region of the user.

Example embodiments may be implemented to be various forms, for example, a personal computer, a laptop computer, a tablet computer, a smartphone, a television, a smart appliance, an intelligent vehicle, a kiosk, and a wearable device. Example embodiments may be applied to process an image for authenticating a user in, for example, a smartphone, a mobile device, and a smart home system. Example embodiments may also be applied to, for example, an intelligent vehicle system and a payment service based on a user authentication. Hereinafter, reference will now be made in detail to examples with reference to the accompanying drawings, wherein like reference numerals refer to like elements throughout.

A detection apparatus according to example embodiments may be configured to be a software module, a hardware module, or a combination thereof. The detection apparatus may be implemented in various forms, for example, a single processor based system, a multi-processor based system, a special-purpose hardware based system, a system including a combination of a processor and a hardware accelerator (HWA), and a cloud computing system.

Figure 1A:
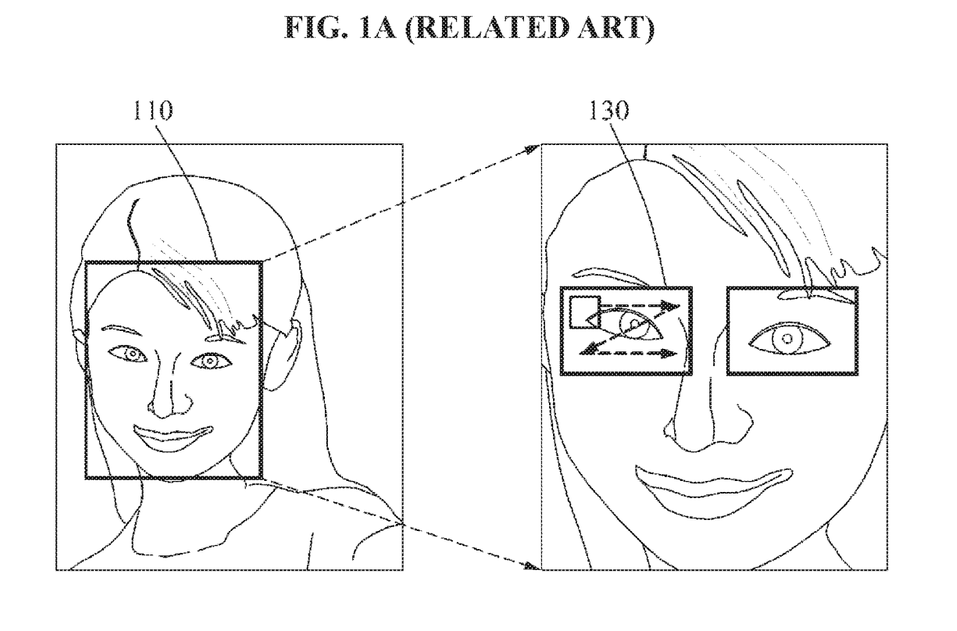
FIGS. 1A and 1B illustrate examples of a method of detecting a biometric region from an input image according to related arts.
Figure 1B:
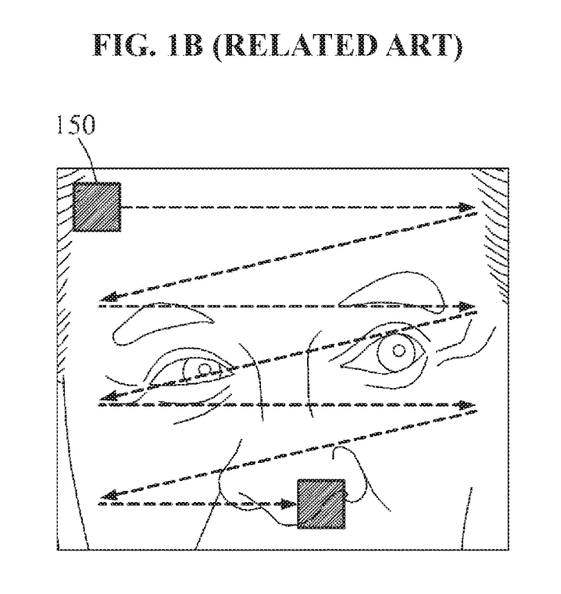

FIGS. 1A and 1B illustrate examples of a method of detecting a biometric region from an input image according to related arts. Although the following descriptions are provided based on a biometric region including an eye or an iris as an example, the biometric region is not limited thereto.

FIG. 1A illustrates a method of detecting an eye from a face. An apparatus for detecting a biometric region may detect a face 110 from an input image, and designate a candidate region 130 of a desired (or alternatively, predetermined) biometric region, for example, the eye, corresponding to a region of interest (ROI) in advance. Hereinafter, the apparatus for detecting a biometric region may also be referred to as, for example, a detection apparatus. When the candidate region 130 is designated in advance, the detection apparatus may apply priori information on a position of the eye in the face 110 and thus, a rate of misdetection may decrease relatively. As such, when the ROI is set widely, the rate of misdetection may decrease and a rate of detection may also decrease.

FIG. 1B illustrates a method of detecting the eye using the iris. Since the detection apparatus detects a partial region, for example the iris, of a face to be the biometric region, a candidate region of the biometric region may not be designated in advance. When the candidate region is not designated in advance, the detection apparatus may perform full scan, for example, full raster scan on an entire image through a detection window 150 having a predetermined or, alternatively, desired step size to detect the biometric region. As illustrated in FIG. 1B, when the entire image is fully scanned by setting the ROI narrowly, the rate of misdetection, for example, a case in which a nostril is recognized as an iris region, may increase.

Figure 2A:
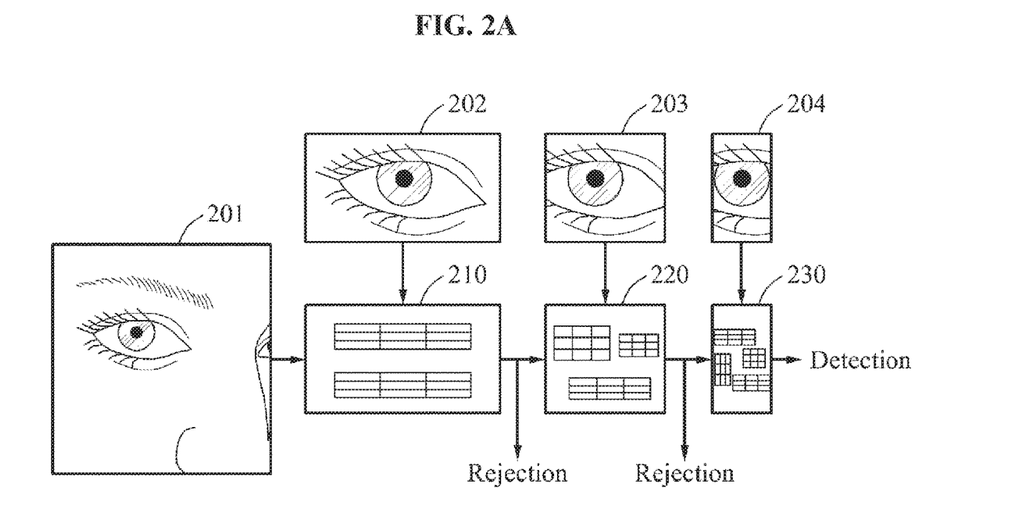
FIGS. 2A and 2B illustrate an example of a method of detecting a biometric region according to at least one example embodiment.

FIGS. 2A and 2B illustrate an example of a method of detecting a biometric region according to at least one example embodiment. Referring to FIG. 2A, a first classifier 210, a second classifier 220, and a third classifier 230 may recognize a biometric region in an input image 210. The first classifier 210, the second classifier 220, and the third classifier 230 may be provided in a multi-stage (e.g., cascade) structure. The first classifier 210, the second classifier 220, and the third classifier 230 may be strong classifiers.

The first classifier 210, the second classifier 220, and the third classifier 230 may detect a biometric region having a different size for each stage based on a threshold learned in advance. The term "stage" may be understood as indicating each stage of classifiers provided in the multi-stage structure. The first classifier 210, the second classifier 220, and the third classifier 230 may correspond to first, second and third stages of a multi-stage structure, respectively. As an example, the first classifier 210 may correspond to the first stage, the second classifier 220 may correspond to the second stage, and the third classifier 230 may correspond to the third stage. In the present disclosure, stages of a multi-stage structure are also referred as "multi-stages."

For each of the multi-stages, an ROI may be set based on a different purpose or a different characteristic. As an example, for the first stage, an ROI may be set to reduce a rate of misdetection. To reduce the rate of misdetection, the first classifier 210 may detect a wide ROI, for example, a region 202 including both eye corner points, by recognizing the region 202 in an input image 201. The first classifier 210 may reject a detection of a region other than an eye region in the input image 201.

As another example, for the second stage and the third stage, ROIs may be set to increase a rate of detection. The second classifier 220 corresponding to the second stage may detect a region 203 including a pupil from a detection result of the first classifier 210. In this example, the second classifier 220 may reject a detection of an eye contour region such as an eye corner other than the pupil in the region 202 including the eye.

The third classifier 230 corresponding to the third stage may detect a region 204 including only the pupil from a detection result of the second classifier 220. In this example, the third classifier 230 may reject a detection of a region other than the pupil and thus, the region 204 including only the pupil may be detected finally.

In an example, it is assumed that an eye is to be detected from an input image capturing a nose region. When the wide ROI is set on the first stage, a detection of the eye in the input image may be rejected on the first stage and thus, the rate of misdetection and a speed of detection may increase. Also, the detection apparatus may reduce the rate of misdetection by detecting the biometric region while gradually reducing a size of ROI on the second stage and the third stage.

As the foregoing, when a different size of ROI is set for each stage, a performance of detecting the pupil may increase and information on the pupil may be analyzed more specifically.

Figure 2B:
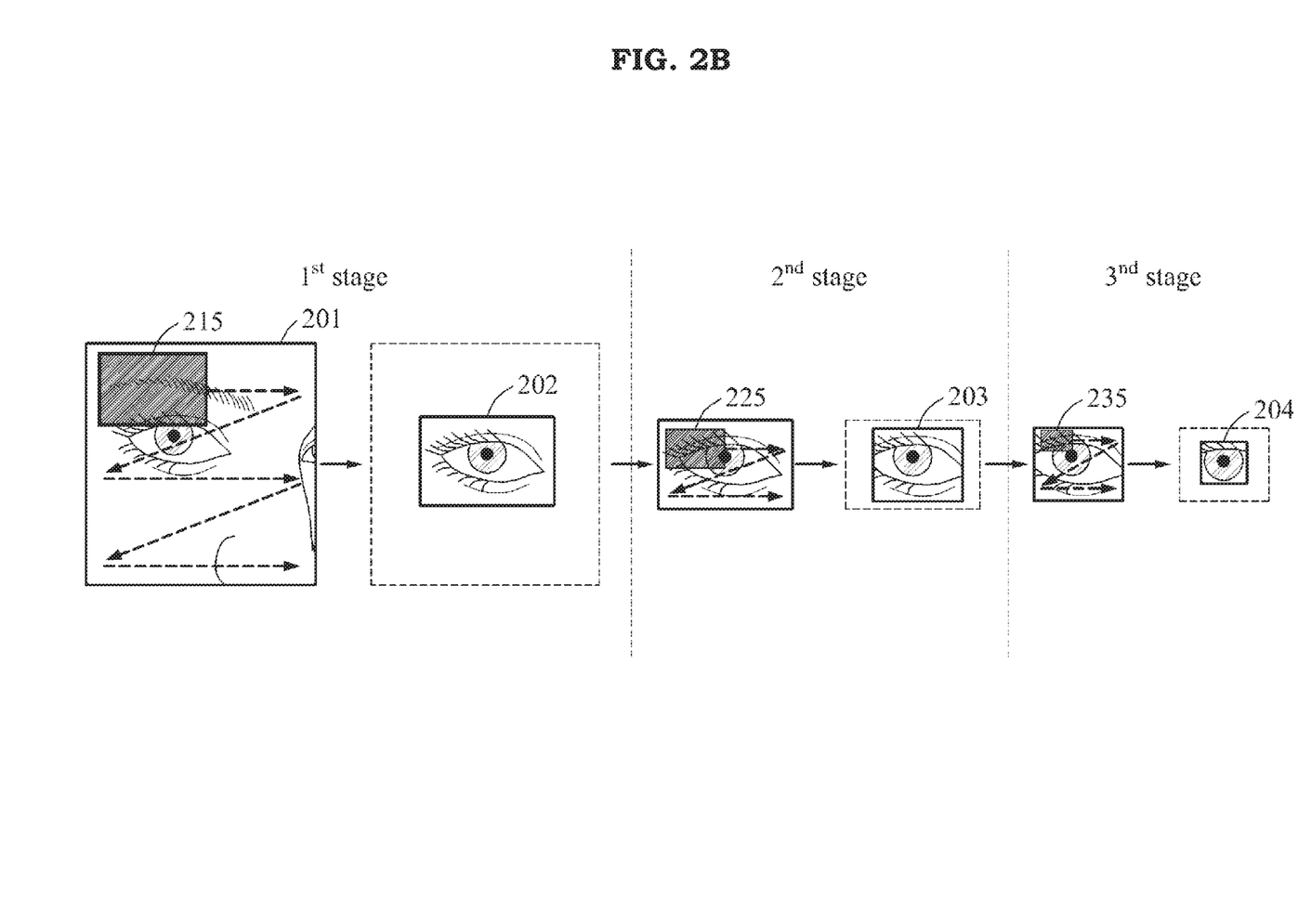

Descriptions related to the different size of the ROI set for each stage will be provided with reference to FIG. 2B.

FIG. 2B illustrates ROIs set to be in a different size for each stage.

As an example, a first ROI, for example, the region 202 on the first stage may be detected from the input image 201 through a first detection window 215 of a first size. A second ROI, for example, the region 203 on the second stage may be detected from the first ROI 202 through a second detection window 225 of a second size. A third ROI, for example, the region 204 on the third stage may be detected from the second ROI 203 through a third detection window 235 of a third size.

Figure 3:
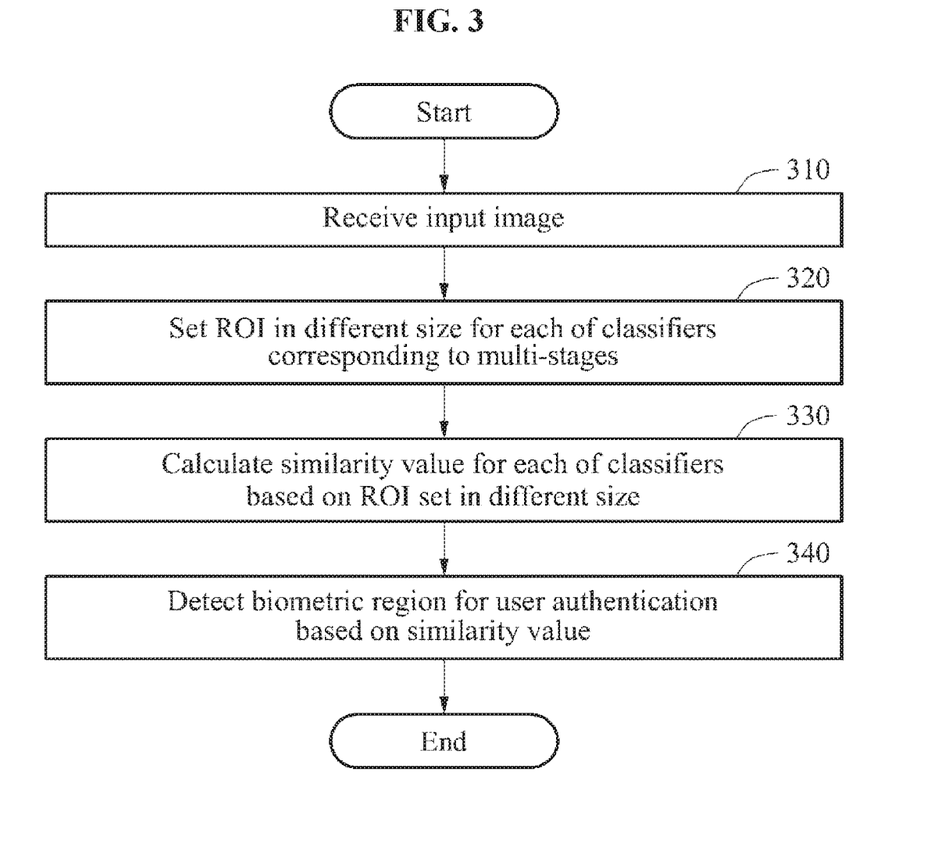
FIG. 3 illustrates another example of a method of detecting a biometric region according to at least one example embodiment.

FIG. 3 illustrates another example of a method of detecting a biometric region according to at least one example embodiment. Referring to FIG. 3, in operation 310, a detection apparatus may receive an input image. The input image may include a biometric region, for example, an iris, a fingerprint, and blood vessel information. The input image may be, for example, an input image grayscaled based on a predetermined or, alternatively, desired size.

In operation 320, the detection apparatus may set an ROI in a different size for each of classifiers corresponding to multi-stages. The ROI may include a biometric region of the input image. The ROI set for each of the classifiers may overlap each other. The classifiers may include, for example, a first classifier, a second classifier, and a third classifier, each configured to recognize a biometric region of a different size. Each of the classifiers may be previously trained based on the different size set for the ROI.

In operation 320, the detection apparatus may set a first size of ROI for the first classifier, set a second size of ROI for the second classifier, and a third size of ROI for the third classifier. In this example, the first size, the second size, and the third size may increase or decrease in sequence.

In operation 330, the detection apparatus may calculate a similarity value for each of the classifiers based on the ROI set in the different size in operation 320. The detection apparatus may compare the ROI set in the different size to a learning image learned in advance, and calculate a score indicating the similarity value between the ROI and the learning image. In this example, the learning image may be differently applied for each of the classifiers. The learning image may be stored in, for example, a learning model database (DB).

In operation 340, the detection apparatus may detect a biometric region for a user authentication based on the similarity value calculated in operation 330. The detection apparatus may detect the biometric region based on a result of comparison between the similarity value and a threshold set in advance. The threshold may be determined based on a learning model learned in advance. The learning model may be determined based on the different size set for the ROI. The detection apparatus may determine the ROI to be a candidate region for the user authentication, for example, when the similarity value is greater than the threshold.

Figure 4:
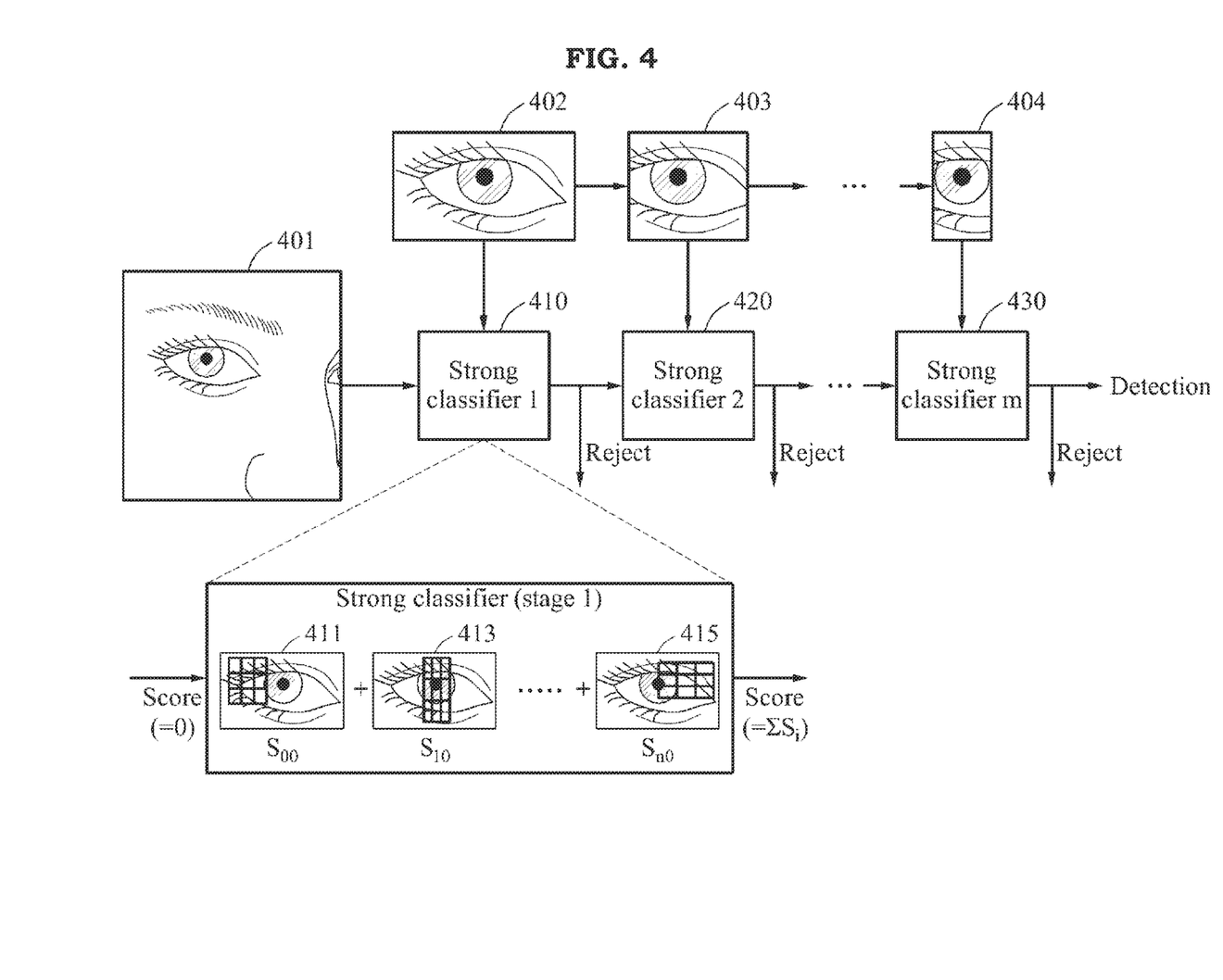
FIG. 4 illustrates an example of a method of detecting a desired biometric region using a boosting-based detector based on a differing input image according to at least one example embodiment.

FIG. 4 illustrates an example of a method of detecting a desired biometric region using a boosting-based detector based on a different input image according to at least one example embodiment. Referring to FIG. 4, a first classifier 410, a second classifier 420, and a third classifier 430 may recognize a biometric region in an input image 410. The first classifier 410, the second classifier 420, and the third classifier 430 may be strong classifiers.

A strong classifier may be configured based on, for example, a boosting algorithm. When a biometric region to be detected is a face, the strong classifier may be configured through the following procedure.

The detection apparatus may collect a positive image, for example, a positive sample, including a detecting target, the face and negative images, for example, negative samples not including the detecting target. The positive image and the negative images may be stored in, for example, a learning model DB.

Based on the collected positive image and the negative images, the detection apparatus may search, for example, at least 18,000 Harr features for a few Harr features suitable for identifying the face by repetitively performing the searching until a rate of detection is satisfied. The detection apparatus may form a strong classifier using weak classifiers based on the found Harr features. Here, the Harr feature may be expressed to be a difference between a sum of white region pixel values and a sum of gray region pixel values. For example, the Harr feature may be expressed to be 1 when the difference is greater than or equal to a predetermined or, alternatively, desired threshold, and may be expressed to be 0 when the difference is less than the predetermined or, alternatively, desired threshold. The at least 180,000 features may be arranged in a 24×24-sized window based on different sizes and positions.

Each of the first classifier 410, the second classifier 420, and the third classifier 420 may be configured as a combination of weak classifiers based on a multi-block local binary pattern (LBP).

The first classifier 410 may include n weak classifiers, for example, weak classifiers 411, 413, and 415. The weak classifiers 411, 413, and the 415 may recognize sub-regions of a region 402 including an eye. In this example, the region 402 may be an ROI set on the first stage in the input image 401.

As an example, the weak classifier 411 may recognize a left sub-region of the region 402, the weak classifier 413 may recognize a middle sub-region of the region 402, and the weak classifier 415 may recognize a right sub-region of the region 403.

The weak classifiers 411 413, and 415 may directly extract the sub-regions from the ROI set on the first stage from the input image 401. The weak classifiers 411 413, and 415 may extract a feature vector from the sub-regions corresponding to the weak classifiers 411 413, and 415, respectively. The weak classifiers 411 413, and 415 may extract the feature vector from the sub-regions through a convolutional neural network (CNN). The feature vector may include a plurality of features.

The weak classifiers 411, 413, and 415 may match the extracted feature vector and a feature vector of a pre-learned learning model. The weak classifiers 411, 413, and 415 may calculate scores S00, S10, and Sn0 indicating a similarity between a sub-region of the input image 401 and a sub-region, of the pre-learned learning model based on an Euclidean distance between the sub-regions.

The first classifier 410 may calculate a similarity value by obtaining a sum of the scores S00, S10, and Sn0 corresponding to the weak classifiers 411, 413, and 415, respectively. In an example, the first classifier 410 may calculate the similarity value by obtaining a weighted sum of the scores S00, S10, and Sn0. In this example, a different weight may be assigned to each of the scores S00, S10, and Sn0 corresponding to the weak classifiers 411, 413, and 415, respectively.

On the second stage, an ROI corresponding to the second classifier 420 in a size smaller than that of the region 402 may be set to be region 403. On the third stage, an ROI corresponding to the third classifier 430 in a size smaller than that of the region 403 may be set to be a region 404.

Similarly to the first classifier 410, each of the second classifier 420 and the third classifier 430 may include weak classifiers, and calculate a similarity value based on scores corresponding to the weak classifiers.

The first classifier 410, the second classifier 420, and the third classifier 430 may set an ROI in a different size for each of stages, and detect a biometric region using a learning model learned in advance. In this example, the learning model may correspond to the ROI in the different size set for each of the stages.

Figure 5:
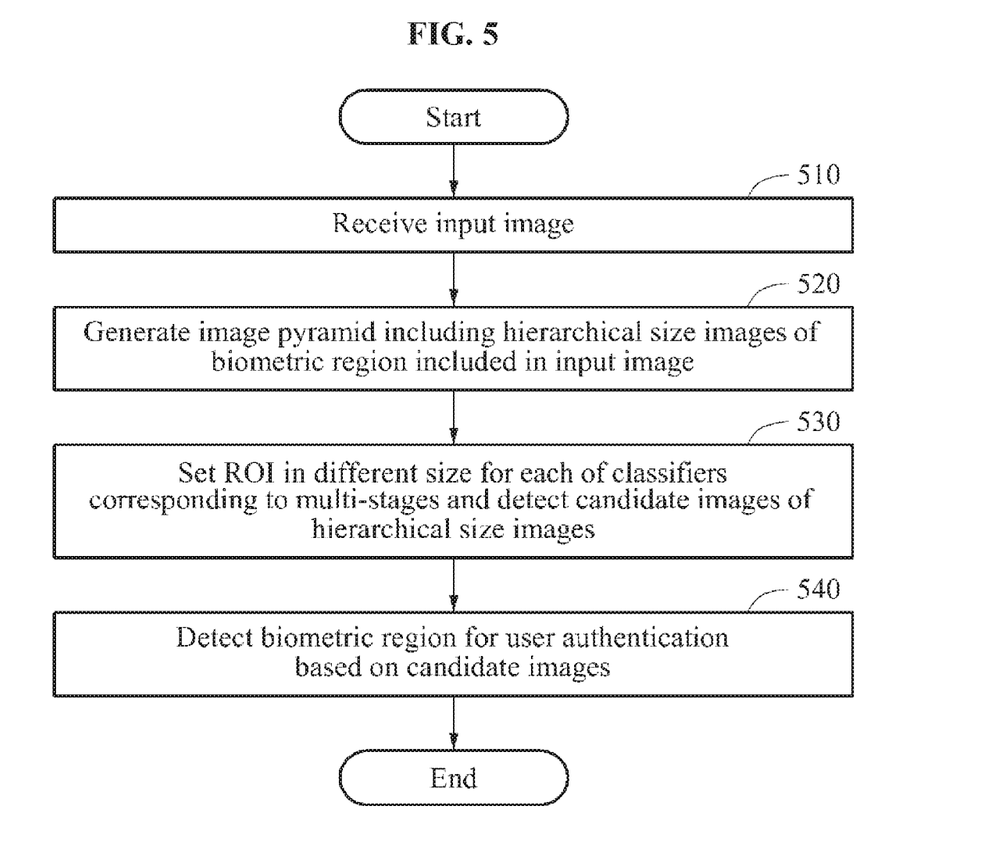
FIG. 5 illustrates still another example of a method of detecting a biometric region according to at least one example embodiment.

FIG. 5 illustrates still another example of a method of detecting a biometric region according to at least one example embodiment. Referring to FIG. 5, in operation 510, a detection apparatus may receive an input image.

In operation 520, the detection apparatus may generate an image pyramid including hierarchical size images of a biometric region included in the input image. The image pyramid may be used to detect the biometric region in various sizes and may include images in different sizes. The hierarchical size images may include images obtained by hierarchically increasing a size of the input image including the biometric region. In an example, a size of a biometric region, for example, an eye included in an input image may be 2 centimeters (cm) breadthwise and 1 cm lengthwise. In this example, the images obtained by hierarchically increasing a size of the input image including the biometric region may be, for example, a 3 cm×3 cm image including an eye being 2 cm breadthwise and 1 cm lengthwise, a 4 cm×4 cm image including the eye being 2 cm breadthwise and 1 cm lengthwise, and a 5 cm×5 cm image including the eye being 2 cm breadthwise and 1 cm lengthwise. The images obtained by hierarchically increasing a size of the input image including the biometric region may be, for example, a rectangular image such as a 5 cm×3 cm image and a 4 cm×3 cm image, and a square image such as a 3 cm×3 cm image.

A size of the biometric region included in the input image may decrease relative to a hierarchically increasing size of the input image based on the image pyramid. In operation 530, in a corresponding image of each image pyramid, the detection apparatus may set an ROI in a different size for each of classifiers corresponding to multi-stages and detect candidate images of the hierarchical size images, thereby determining a position of an object of interest, the iris.

A method of detecting the candidate images will be described with reference to FIG. 6.

In an example, prior to performing operation 530, the detection apparatus may simplify a process of the calculating of operation 530 by generating an integral image for a multi-block LBP. For example, in a calculation of a Harr feature or an LBP, a process of obtaining a sum of pixels included in quadrangle regions of various sizes may be repetitively performed, which may be a time-consuming operation. Thus, by generating the integral image based on an original image, the sum of the pixels included in the quadrangle regions may be processed at a relatively high speed irrespective of a size of a screen region.

In operation 540, the detection apparatus may detect the biometric region for the user authentication based on the candidate images detected in operation 530. The detection apparatus may detect the biometric region by matching the candidate images. Alternatively, the detection apparatus may detect the biometric region by removing a misdetection, for example, a false alarm from the candidate images.

Figure 6:
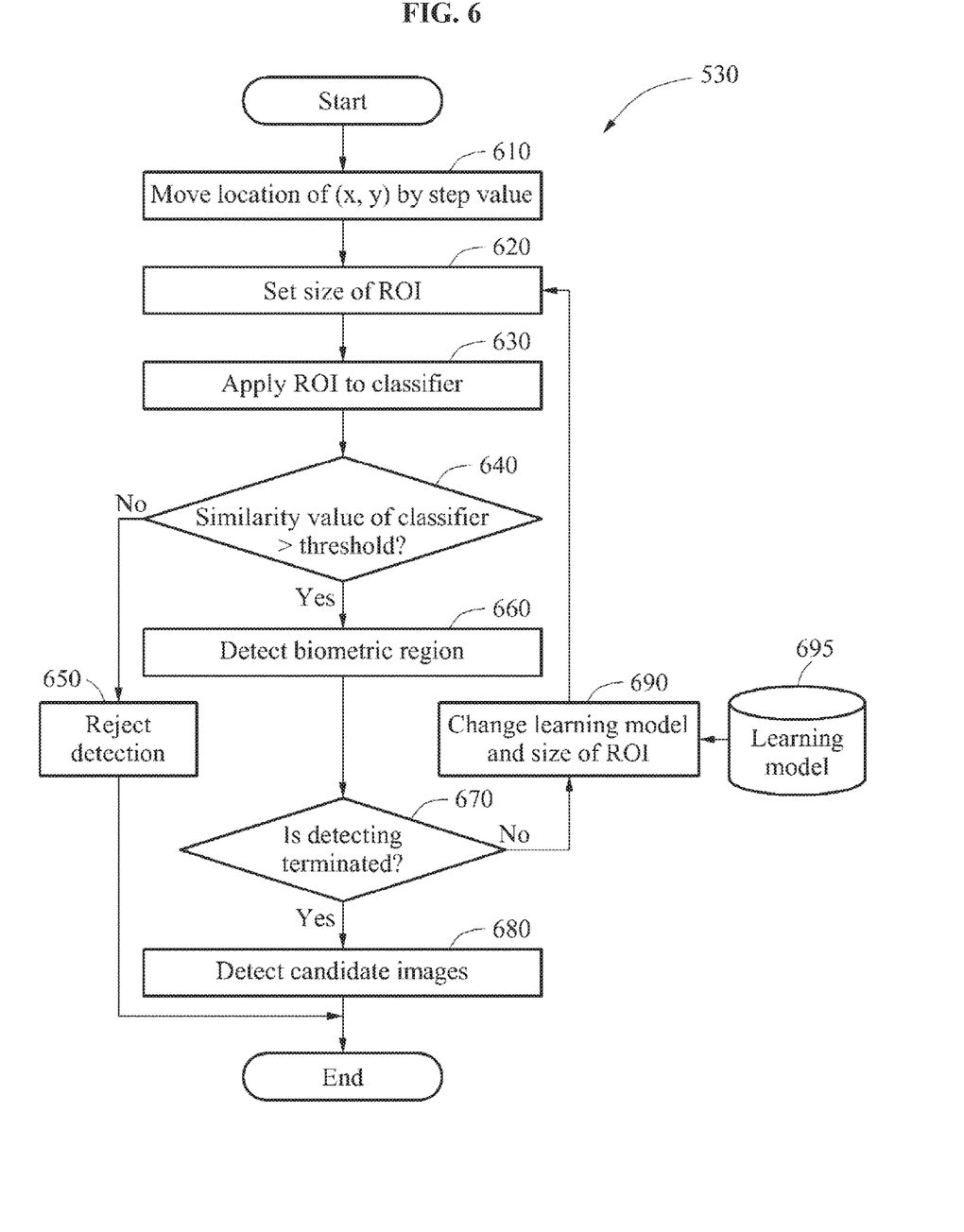
FIG. 6 illustrates an example of a method of detecting candidate images according to at least one example embodiment.

FIG. 6 illustrates an example of a method of detecting candidate images according to at least one example embodiment. FIG. 6 illustrates a method of detecting candidate image with respect to hierarchical size images included in an image pyramid generated by a detection apparatus based on an ROI differently set for each of stages in an example of FIG. 5. The following operations may be performed with respect to one of the hierarchical size images included in the image pyramid.

In operation 610, the detection apparatus may move a location of a start point (x, y) for a detection by a predetermined or, alternatively, desired step value, for example, 2 pixels, in one hierarchical size image. The detection apparatus may move the location of the start point (x, y) by the step value, for example, through a raster scan.

In operation 620, the detection apparatus may set a size of an ROI. The size of the ROI may have, for example, a width and a height. Here, an initial size of the ROI may be input or set by a user. The size of the ROI may also be understood as a size of a detection window for detecting the ROI. The initial size of the ROI may be set as a first size of the ROI for a first classifier.

In operation 630, the detection apparatus may apply the ROI set in operation 620 to a classifier to calculate a similarity value.

In operation 640, the detection apparatus may compare a similarity value of the classifier to a threshold set in advance. The similarity value of the classifier may also be understood as a similarity value of an ROI detected by the classifier. The detection apparatus may determine whether a score of a classifier corresponding to one stage, that is, the similarity value is greater than a threshold obtained based on a learning model. When the similarity value of the classifier is less than or equal to a preset threshold, the detection apparatus may terminate an operation by rejecting a detection of the biometric region in operation 650.

When the similarity value of the classifier is greater than the preset threshold, the detection apparatus may detect a biometric region corresponding to the ROI in operation 660. Also, when the similarity value of the classifier is greater than the preset threshold, the detection apparatus may detect a biometric region corresponding to an ROI having a most significant similarity value among thresholds. Alternatively, the detection apparatus may detect all biometric regions of an ROI corresponding to a similarity value greater than the threshold.

In operation 670, the detection apparatus may determine whether the detecting of the biometric region is terminated. In this example, whether the detection of the biometric region is terminated may be determined based on whether the determining is terminated in all classifiers corresponding to multi-stages. As an example, when the detection apparatus includes five classifiers, the detection apparatus may determine that the detecting is terminated in response to a termination of the biometric region in all of the five classifiers.

When it is determined that the detecting is terminated in operation 670, the detection apparatus may detect candidate images of the biometric region for the user authentication in operation 680. A candidate image of the biometric region may be determined to be a final biometric region for the user authentication.

When it is determined that the detecting is not terminated in operation 670, the detection apparatus may change the learning model and the size of the ROI in operation 690 so as to be applied to a subsequent classifier. In this example, the learning model may be a learning model stored in a learning model DB 695. According to at least some example embodiments, the learning model DB 695 may be included in the detection apparatus. According to at least some example embodiments, the learning model DB 695 may be accessible by the detection apparatus via, for example, a communications network. Thereafter, the detection apparatus may return to operation 620, and set the size of the ROI changed in operation 690 to a size of an ROI to be applied to the subsequent classifier.

Figure 7:
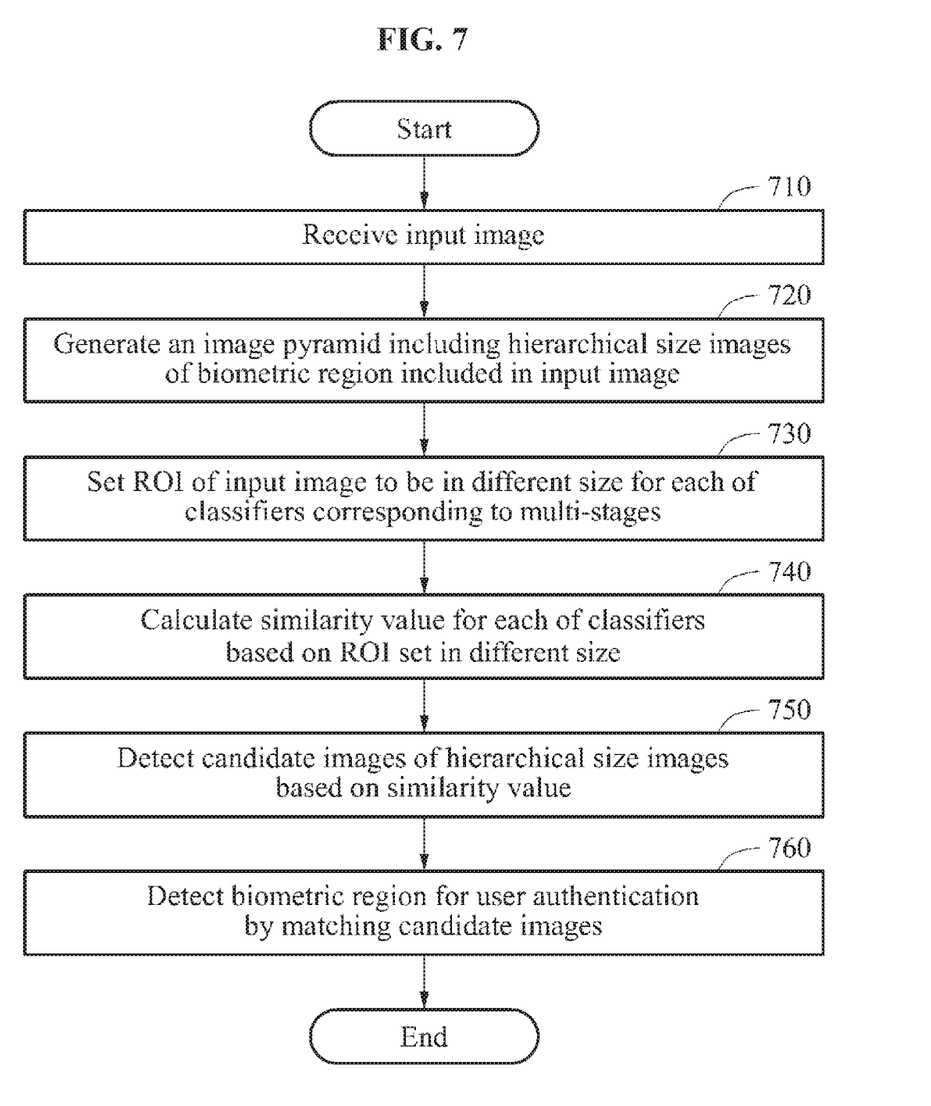
FIG. 7 illustrates yet another example of a method of detecting a biometric region according to at least one example embodiment.

FIG. 7 illustrates yet another example of a method of detecting a biometric region according to at least one example embodiment. Referring to FIG. 7, in operation 710, a detection apparatus may receive an input image.

In operation 720, the detection apparatus may generate an image pyramid including hierarchical size images of a biometric region included in the input image.

In operation 730, the detection apparatus may set an ROI of the input image to be in a different size for each of classifiers corresponding to multi-stages.

In operation 740, the detection apparatus may calculate a similarity value for each of the classifiers based on the ROI set in the different size.

In operation 750, the detection apparatus may detect candidate images of the hierarchical size images based on the similarity value calculated in operation 740.

In operation 760, the detection apparatus may detect a biometric region for a user authentication by matching the candidate images detected in operation 750.

Figure 8:
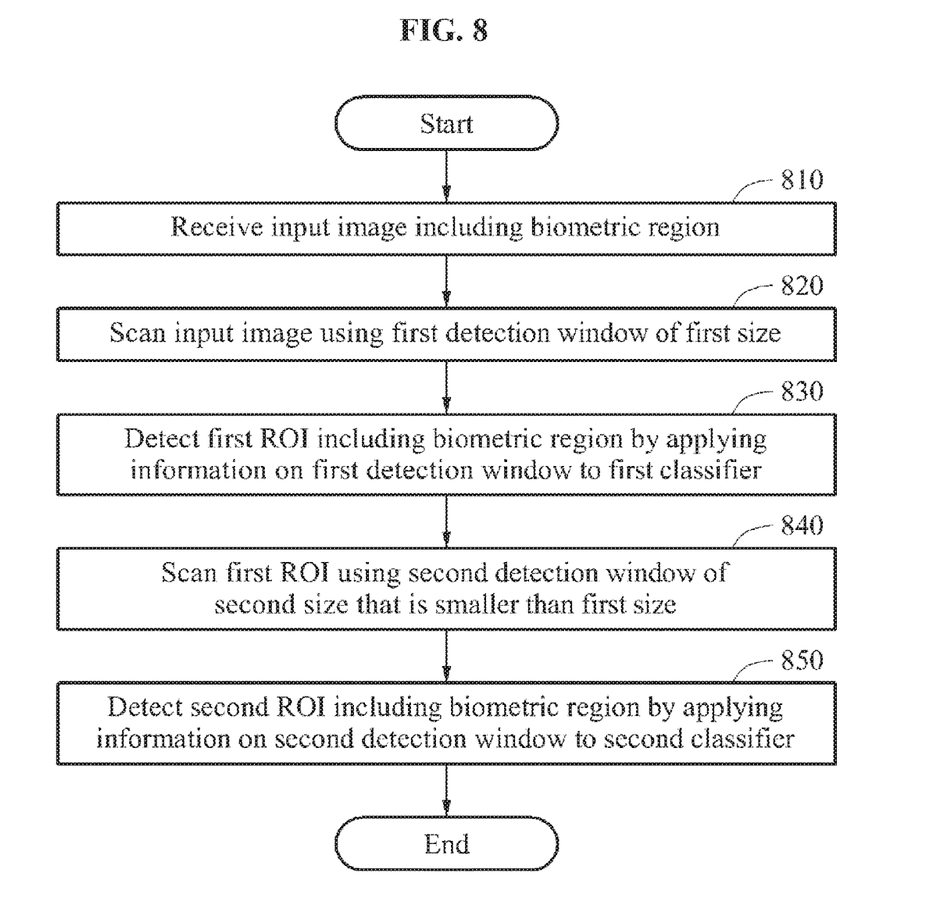
FIG. 8 illustrates further another example of a method of detecting a biometric region according to at least one example embodiment.

FIG. 8 illustrates further another example of a method of detecting a biometric region according to at least one example embodiment. Referring to FIG. 8, in operation 810, a detection apparatus may receive an input image including a biometric region. The biometric region may include, for example, an iris region.

In operation 820, the detection apparatus may scan the input image using a first detection window of a first size.

In operation 830, the detection apparatus may detect a first ROI including the biometric region by applying information on the first detection window to a first classifier. The first classifier may be previously trained based on an ROI set to be in the first size. The detection apparatus may compare a first similarity value output by the first classifier to a first threshold determined in advance, and determine whether the first ROI includes the biometric region. The first similarity value may indicate a degree to which the first ROI corresponds to an eye region.

In operation 840, the detection apparatus may scan the first ROI using a second detection window of a second size that is smaller than the first size.

In operation 850, the detection apparatus may detect a second ROI including the biometric region by applying information on the second detection window to a second classifier. The second classifier may be previously trained based on an ROI set to be in the second size. The detection apparatus may compare a second similarity value output by the second classifier to a second threshold determined in advance, and determine whether the second ROI includes the biometric region. The second similarity value may indicate a degree to which the second ROI corresponds to an iris region.

Figure 9:
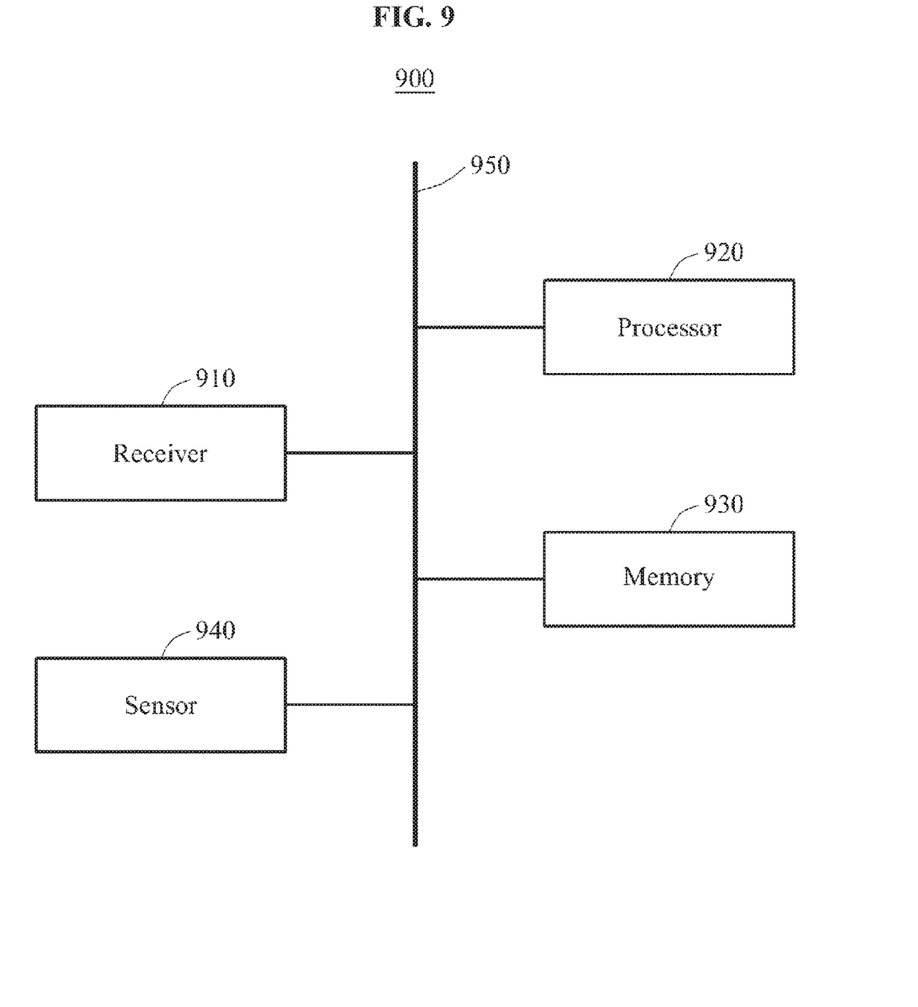
FIG. 9 illustrates an example of an apparatus for detecting a biometric region according to at least one example embodiment.

FIG. 9 illustrates an example of an apparatus 900 for detecting a biometric region according to at least one example embodiment.

Referring to FIG. 9, the apparatus 900 may include a receiver 910 and a processor 920. The apparatus 900 may also include a memory 930 and a sensor 940.

The receiver 910, the processor 920, the memory 930, and the sensor 940 may communicate with one another through a bus 950.

The receiver 910 may receive an input image. For example, the receiver 910 may receive an input image including a biometric region sensed by the sensor 940. According to at least some example embodiments, though the receiver 910 is illustrated as being separate from the processor 920, the receiver 910 may be embodied in the processor 920. According to at least some example embodiments, functions described in the preset disclosure as being performed by the receiver 910 may be performed or, alternatively, controlled by the processor 920.

The processor 920 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers. According to at least some example embodiments, the apparatus 900 is example implementation of a detection apparatus. For example, the memory 930 may store program code including instructions for causing the processor 920, when executing the program code, to perform or control any or all functions described in the present disclosure as being performed by a detection apparatus or the apparatus 900 (or an element thereof).

The processor 920 may calculate a similarity value for each of classifiers corresponding to multi-stages based on an ROI of the input image. In this example, the ROI may be in a size set to be different for each of the classifiers. The processor 920 may detect a biometric region for a user authentication based on the similarity value. The classifiers may include, for example, a first classifier, a second classifier, and a third classifier previously trained based on a differently set size of ROI. The processor 920 may set a first size of ROI for the first classifier, set a second size of ROI for the second classifier, and set a third size of ROI for the third classifier. The first size, the second size, and the third size may increase or decrease in sequence.

The processor 920 may compare the similarity value to a threshold set in advance, and determine the ROI to be a candidate region for the user authentication based on a result of the comparing. In this example, the threshold may be determined based on a learning model determined based on the differently set size of ROI.

Also, the processor 920 may perform at least one of the methods described with reference to FIGS. 1 through 8.

The processor 920 may execute a program and control the apparatus 900. A code of the program executed by the processor 920 may be stored in the memory 930. The apparatus 900 may be connected to an external source, for example, a PC and a network, through an input and output device (not shown) to perform a data exchange.

The memory 930 may store a learning model database including a pre-registered learning image or learning models. The memory 930 may store, for example, a newly registered input image and an input image including a biometric region captured by the sensor 940. The memory 930 may be a volatile memory or a non-volatile memory.

The sensor 940 may include a sensor configured to recognize an eye of a user or an iris pattern included in the eye. The sensor 940 may scan or capture an iris pattern between a pupil and a sclera, for example, a white area of an eye. According to at least some example embodiments, the processor 920 may control the operations of the sensor 940.

A detection apparatus may include various types of electronic systems including, for example, a mobile device such as a mobile phone, a smartphone, a PDA, a tablet computer, a laptop computer and the like, a computing device such as a PC, the tablet computer, a netbook, and the like, and an electronic device such as a television, a smart television, a security device for a gate control, and the like.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of detecting a biometric region, the method comprising:
   receiving an input image;
   setting a plurality of regions of interest (ROI) corresponding to a plurality of classifiers, respectively, the plurality of classifiers corresponding to a plurality of multi-stages, respectively, the plurality of ROIs having different areas with respect to each other, each ROI of the plurality of ROIs including a biometric region of the input image;
   calculating a plurality of similarity values for the plurality of classifiers, respectively, based on the ROIs corresponding to the plurality of classifiers from among the plurality of ROIs; and
   detecting a first biometric region for a user authentication based on at least one of the plurality of similarity values,
   wherein, for each classifier of the plurality of classifiers, the classifier is previously trained based on a corresponding area, the corresponding area being the area of the ROI to which the classifier corresponds.

2. The method of claim 1 wherein,
   the plurality of classifiers includes a first classifier, a second classifier, and a third classifier, the first, second, and third classifier each differing from one another,
   the setting a plurality of ROIs includes setting a first ROI to have a first area for the first classifier, setting a second ROI to have a second area for the second classifier, and setting a third ROI to have a third area for the third classifier, and
   the plurality of ROIs includes the first, second, and third ROIs.

3. The method of claim 2, wherein the first area, the second area, and the third area increase or decrease in sequence.

4. The method of claim 2, further comprising:
receiving an initial area,
wherein the setting a first ROI to have a first area includes setting the initial area to be the first area.

5. The method of claim 1, wherein the detecting comprises:
detecting the first biometric region based on at least one of the plurality of similarity values and a threshold.

6. The method of claim 5, wherein the detecting comprises:
determining an ROI from among the plurality of ROIs to be a candidate region for the user authentication when a similarity value from among the plurality of similarity values is greater than the threshold.

7. The method of claim 5, further comprising:
generating a learning model prior to the detecting a first biometric region for a user authentication; and
determining the threshold based on the learning model.

8. The method of claim 7, wherein the learning model is determined based on at least one of the different areas set for the plurality of ROIs.

9. A non-transitory computer-readable medium storing a computer program including instructions that, when executed by one or more processors, cause the one or more processors to perform the method of claim 1.

10. A method of detecting a biometric region, the method comprising:
receiving an input image including a biometric region;
scanning the input image using a first detection window of a first area;
detecting a first region of interest (ROI) including the biometric region by applying information corresponding to the first detection window to a first classifier;
scanning the first ROI using a second detection window of a second area that is smaller than the first area; and
detecting a second ROI including the biometric region by applying information corresponding to the second detection window to a second classifier,
wherein the first classifier is previously trained based on an ROI set in the first area, and the second classifier is previously trained based on an ROI set in the second area.

11. The method of claim 10, wherein the detecting a first ROI includes determining whether the first ROI includes the biometric region based on a similarity value output by the first classifier and a first threshold, and
the similarity value indicates a degree to which the first ROI corresponds to an eye region.

12. The method of claim 10, wherein the detecting a second ROI includes determining whether the second ROI includes the biometric region based on a similarity value output by the second classifier and a first threshold, and
the similarity value indicates a degree to which the second ROI corresponds to an iris region.

13. The method of claim 10, wherein the biometric region includes an iris region.

14. An apparatus for detecting a biometric region, the apparatus comprising:
a memory storing computer-executable instructions; and
one or more processors configured to execute the instructions such that the one or more processors are configured to,
receive an input image,
set a plurality of regions of interest (ROI) corresponding to a plurality of classifiers, respectively, the plurality of classifiers corresponding to a plurality of multi-stages, respectively, the plurality of ROIs having different areas with respect to each other, each ROI of the plurality of ROIs including a biometric region of the input image,
calculate a plurality of similarity values for the plurality of classifiers, respectively, based on the ROIs corresponding to the plurality of classifiers from among the plurality of ROIs, and
detect a first biometric region for a user authentication based on at least one of the plurality of similarity values,
wherein, for each classifier of the plurality of classifiers, the classifier is previously trained based on a corresponding area, the corresponding area being the area of the ROI to which the classifier corresponds.

15. The apparatus of claim 14 wherein,
the plurality of classifiers includes a first classifier, a second classifier, and a third classifier, the first, second, and third classifier each differing from one another,
the one or more processors are configured to execute the instructions such that the one or more processors are configured to set a first ROI to have a first area for the first classifier, set a second ROI to have a second area for the second classifier, and set a third ROI to have a third area for the third classifier, and
the plurality of ROIs includes the first, second, and third ROIs.

16. The apparatus of claim 15, wherein the first area, the second area, and the third area increase or decrease in sequence.

17. The apparatus of claim 14, wherein the one or more processors are configured to execute the instructions such that the one or more processors are configured to determine an ROI from among the plurality of ROIs to be a candidate region for the user authentication when a similarity value from among the plurality of similarity values is greater than a first threshold,
the first threshold being a threshold determined based on a first learning model,
the first learning model being determined based on at least one of the plurality of ROIs.

* * * * *